(12) United States Patent
Sakurai

(10) Patent No.: US 11,584,326 B2
(45) Date of Patent: Feb. 21, 2023

(54) ROOF AIRBAG SYSTEM AND VEHICLE

(71) Applicant: Toyota Jidosha Kabushiki Kaisha, Toyota (JP)

(72) Inventor: Hideyuki Sakurai, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/403,197

(22) Filed: Aug. 16, 2021

(65) Prior Publication Data

US 2022/0080917 A1 Mar. 17, 2022

(30) Foreign Application Priority Data

Sep. 16, 2020 (JP) .............................. JP2020-155624

(51) Int. Cl.
| | |
|---|---|
| *B60R 21/214* | (2011.01) |
| *B60R 21/01* | (2006.01) |
| *B60N 2/02* | (2006.01) |
| *B60R 21/232* | (2011.01) |

(52) U.S. Cl.
CPC .......... *B60R 21/214* (2013.01); *B60N 2/0276* (2013.01); *B60R 21/01* (2013.01); *B60R 21/232* (2013.01); *B60N 2002/0268* (2013.01); *B60N 2002/0272* (2013.01)

(58) Field of Classification Search
CPC . B60R 21/214; B60R 21/01; B60R 21/01554; B60R 21/232; B60R 21/213; B60N 2/0276; B60N 2002/0268; B60N 2002/0272
See application file for complete search history.

(56) References Cited

U.S. PATENT DOCUMENTS

| | | | |
|---|---|---|---|
| 7,926,840 B1 | 4/2011 | Choi | |
| 9,428,137 B2* | 8/2016 | Lee | B60N 2/42718 |
| 10,589,646 B2* | 3/2020 | Komura | B60N 2/0276 |
| 10,899,456 B2* | 1/2021 | Penley | B60N 2/427 |
| 11,377,058 B2* | 7/2022 | Ohno | B60R 21/23138 |
| 2003/0052519 A1* | 3/2003 | Reynolds | B60R 22/1951 |
| | | | 297/216.1 |

(Continued)

FOREIGN PATENT DOCUMENTS

| | | |
|---|---|---|
| DE | 102007007010 A1 | 8/2008 |
| DE | 102010016998 A1 | 6/2011 |

(Continued)

*Primary Examiner* — Paul N Dickson
*Assistant Examiner* — Tiffany L Webb
(74) *Attorney, Agent, or Firm* — Dinsmore & Shohl LLP

(57) ABSTRACT

A roof airbag system includes a roof airbag, a lifting mechanism, a collision sensor, memory, and a processor coupled to the memory. The roof airbag is provided at a roof portion of a vehicle, receives a supply of gas from an inflator and deploys toward an upper body side of a vehicle occupant sitting on a vehicle seat. The lifting mechanism is provided at a seat cushion side of the vehicle seat and lifts a thigh area of the vehicle occupant. A collision sensor detects a collision of the vehicle. The processor is configured to, when a seat back of the vehicle seat is tilted more than a predetermined angle to the seat rear side and the collision sensor detects a collision of the vehicle, control the lifting mechanism to lift the thigh area of the vehicle occupant and control operation of the inflator to deploy the roof airbag.

8 Claims, 7 Drawing Sheets

(56) References Cited

U.S. PATENT DOCUMENTS

| | | | |
|---|---|---|---|
| 2019/0084517 A1* | 3/2019 | Iyer | B60R 21/214 |
| 2020/0079255 A1* | 3/2020 | Ohno | B60R 21/01552 |
| 2020/0094770 A1 | 3/2020 | Fischer et al. | |
| 2020/0122610 A1 | 4/2020 | Tanaka et al. | |
| 2020/0139923 A1 | 5/2020 | Ostling et al. | |
| 2020/0164771 A1* | 5/2020 | Unnervik | B60N 2/0276 |

FOREIGN PATENT DOCUMENTS

| | | |
|---|---|---|
| DE | 102017115095 A1 | 1/2019 |
| DE | 102019125657 A1 | 3/2020 |
| EP | 3640095 B1 | 2/2021 |
| JP | 2016-030546 A | 3/2016 |
| JP | 2020-063004 A | 4/2020 |

\* cited by examiner

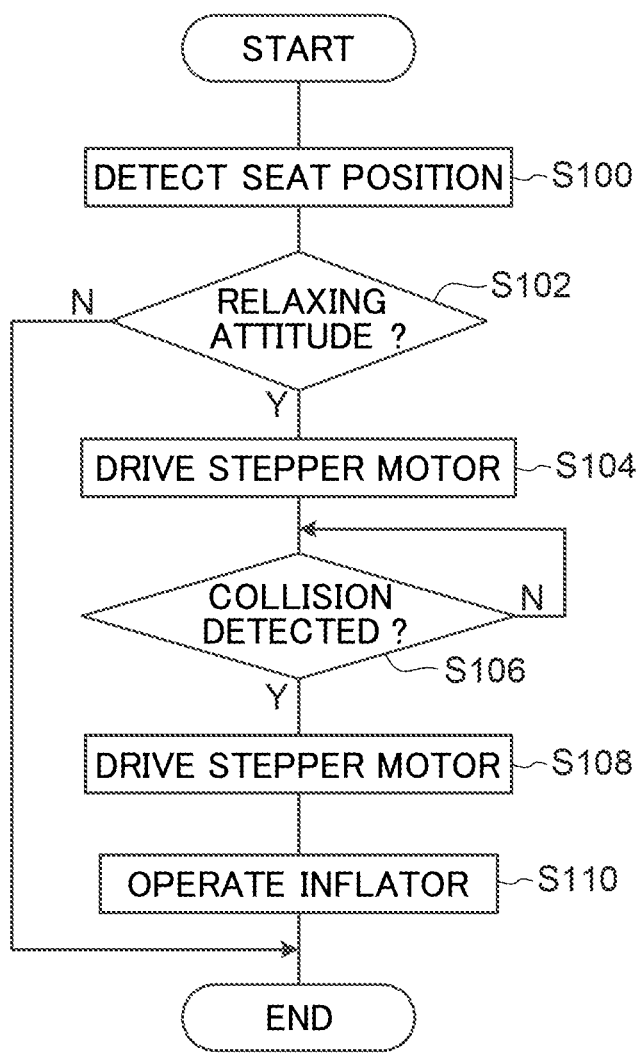

ROOF AIRBAG SYSTEM AND VEHICLE

CROSS-REFERENCE TO RELATED APPLICATION

This application is based on and claims priority under 35 USC 119 from Japanese Patent Application No. 2020-155624 filed on Sep. 16, 2020, the disclosure of which is incorporated by reference herein.

BACKGROUND

Technical Field

The present disclosure relates to a roof airbag system and a vehicle.

Related Art

A technology relating to an airbag device for a rear seat that can be inflated from a roof portion of a vehicle cabin interior is disclosed in, for example, Japanese Patent Application Laid-Open (JP-A) No. 2016-030546. In this conventional technology, the airbag device is provided with a first bag portion and a second bag portion. The first bag portion deploys from a roof portion of a vehicle to a lower side in the vehicle vertical direction, toward a front side of a rear seat. At a time of inflation and deployment of the first bag portion, the second bag portion abuts against the front face of an upper portion of the first bag portion that is in an deployed state. When an impact from a rear seat occupant is being absorbed, the first bag portion abuts against the second bag portion. Thus, swinging of the first bag portion toward the vehicle front side is restrained.

JP-A No. 2020-063004 discloses a technology relating to a vehicle occupant protection device that, when a collision acts from the front of a vehicle, protects a vehicle occupant by limiting forward movement of a waist area of the vehicle occupant.

In this conventional technology, two uplift mechanisms are provided that push up the vehicle occupant with airbags provided inside a seat cushion on which the vehicle occupant is sitting: an uplift mechanism that pushes up the waist area of the vehicle occupant and an uplift mechanism that pushes up the thigh area of the vehicle occupant. At a time of frontal collision of the vehicle, movement of the waist area of the vehicle occupant toward the front side is suppressed by these uplift mechanisms.

However, in these conventional technologies, a vehicle occupant is restrained by airbags without regard to the position of a vehicle seat in the vehicle front-rear direction or the attitude of a vehicle occupant (referred to as a "reclining angle"). Accordingly, deployment amounts of the airbags must be greater and costs are correspondingly increased. Thus, there is scope for improvement in this regard.

SUMMARY

The present disclosure provides, at low cost, a roof airbag system and a vehicle that may protect a vehicle occupant irrespective of a position of a vehicle seat and an attitude of the vehicle occupant.

A roof airbag system according to a first aspect includes: a roof airbag provided at a roof portion of a vehicle, the roof airbag receiving a supply of gas from an inflator and deploying toward an upper body side of a vehicle occupant sitting on a vehicle seat; a lifting mechanism that is provided at a seat cushion side of the vehicle seat and lifts a thigh area of the vehicle occupant; a collision sensor that detects a collision of the vehicle; a seat control section that, when a seat back of the vehicle seat is tilted more than a predetermined angle to a seat rear side and the collision sensor detects a collision of the vehicle, controls the lifting mechanism so as to lift the thigh area of the vehicle occupant; and a gas control section that, in a case in which the seat back of the vehicle seat is tilted more than the predetermined angle to the seat rear side and the collision sensor detects the collision of the vehicle, controls operation of the inflator so as to deploy the roof airbag.

In the roof airbag system according to the first aspect, the roof airbag, the lifting mechanism, the collision sensor, the seat control section and the gas control section are provided. The roof airbag is provided at the roof portion of the vehicle. The roof airbag receives a supply of gas from the inflator and deploys toward the upper body side of a vehicle occupant sitting on the vehicle seat. In the present disclosure, the lifting mechanism that lifts the thigh area of the vehicle occupant is provided at the seat cushion side of the vehicle seat.

In the present disclosure, when a collision of the vehicle is detected by the collision sensor that detects collisions of the vehicle while the seat back of the vehicle seat is tilted more than the predetermined angle toward the seat rear side, the lifting mechanism is controlled by the seat control section so as to lift the thigh area of the vehicle occupant, and operation of the inflator is controlled by the gas control section so as to deploy the roof airbag.

That is, in the present disclosure, in a case in which the seat back of the vehicle seat is tilted more than the predetermined angle toward the seat rear side (in a "relaxing attitude") and a collision of the vehicle is detected by the collision sensor, the thigh area of the vehicle occupant is lifted and the roof airbag deploys. For example, the thigh area of the vehicle occupant is lifted up and the body of the vehicle occupant is inflected into a "V" shape in side view between the thigh area and the upper body. As a result, a spacing between the thigh area and upper body of the vehicle occupant may be made smaller at a time of collision of the vehicle compared to the vehicle occupant sitting on the vehicle seat in the relaxing attitude.

Meanwhile, the roof airbag deploys toward the upper body side of the vehicle occupant. More specifically, the roof airbag deploys to between the thigh area and upper body of the vehicle occupant. Because the spacing between the thigh area and upper body of the vehicle occupant is made smaller, a volume by which the roof airbag is deployed may be made smaller. That is, a deployment amount of the roof airbag may be reduced. Therefore, in the present disclosure, the deployment amount of the roof airbag may be suppressed and costs may be reduced.

In a roof airbag system according to a second aspect, the roof airbag system according to the first aspect further includes a seat sensor that detects at least one of a position of the vehicle seat in the front-rear direction and a reclining angle of the vehicle seat. The seat control section adjusts a lifting amount of the thigh area of the vehicle occupant by the lifting mechanism based on a detection result of the seat sensor.

In the roof airbag system according to the second aspect, the lifting amount of the thigh area of the vehicle occupant by the lifting mechanism is adjusted by the seat control section based on sensor detection results detecting at least one of the position of the vehicle seat in the front-rear direction (vehicle seat position) and the reclining angle of the vehicle seat (vehicle occupant attitude).

For example, when the vehicle seat is disposed at the rear side in the vehicle front-rear direction, a separation distance between the roof airbag and the vehicle occupant is greater than when the vehicle seat is disposed at the front side in the vehicle front-rear direction. In the present disclosure, the spacing between the thigh area and upper body of the vehicle occupant may be altered by the lifting mechanism altering the lifting amount of the thigh area of the vehicle occupant. For example, the spacing between the thigh area and upper body of the vehicle occupant may be made smaller by an increase in the lifting amount of the thigh area of the vehicle occupant.

Accordingly, when the vehicle seat is disposed at the rear side in the vehicle front-rear direction, the lifting amount of the thigh area of the vehicle occupant is specified to be larger than when the vehicle seat is disposed at the front side in the vehicle front-rear direction. As a result, when the vehicle seat is disposed at the rear side in the vehicle front-rear direction, the spacing between the thigh area and upper body of the vehicle occupant may be made smaller than when the vehicle seat is disposed at the front side in the vehicle front-rear direction. That is, a volume by which the roof airbag is deployed when the vehicle seat is disposed at the rear side may be made smaller.

Thus, because the lifting amount of the thigh area of the vehicle occupant is adjusted by the seat control section in accordance with the vehicle seat position and vehicle occupant attitude, the roof airbag may protect the vehicle occupant irrespective of the vehicle seat position and vehicle occupant attitude.

In a roof airbag system according to a third aspect, the roof airbag system according to the first aspect further includes: a seat sensor that detects at least one of a position of the vehicle seat in the front-rear direction and a reclining angle of the vehicle seat; an angle adjustment mechanism that is provided at the roof airbag side and adjusts a expansion angle that the roof airbag forms with a ceiling surface of a cabin interior; and an angle control section that adjusts the expansion angle of the roof airbag via the angle adjustment mechanism based on a detection result of the seat sensor.

The roof airbag system according to the third aspect is additionally provided with the seat sensor, the angle adjustment mechanism and the angle control section. At least one of the vehicle seat position and vehicle occupant attitude is detected by the seat sensor. The angle adjustment mechanism is provided at the roof airbag side and adjusts the expansion angle to be formed between the roof airbag and the ceiling surface of the cabin interior. The expansion angle of the roof airbag is adjusted by the angle control section with the angle adjustment mechanism based on detection results from the seat sensor.

As mentioned above, when the vehicle seat is disposed at the rear side in the vehicle front-rear direction, the separation distance between the roof airbag and the vehicle occupant on the vehicle seat is greater than when the vehicle seat is disposed at the front side in the vehicle front-rear direction.

However, in the present disclosure, the expansion angle of the roof airbag may be adjusted by the angle adjustment mechanism. The more acute the expansion angle that the roof airbag forms with the ceiling surface of the cabin interior, the further toward the rear side in the vehicle front-rear direction the roof airbag deploys.

Therefore, in the present disclosure, when the vehicle seat is disposed at the rear side in the vehicle front-rear direction, the expansion angle of the roof airbag is specified to be smaller than when the vehicle seat is disposed at the front side in the vehicle front-rear direction. Accordingly, when the vehicle seat is disposed at the rear side in the vehicle front-rear direction, the roof airbag may be deployed further toward the rear side in the vehicle front-rear direction than when the vehicle seat is disposed at the front side in the vehicle front-rear direction.

Thus, in the present disclosure, the deployment amount of the roof airbag may be suppressed by adjusting the expansion angle of the roof airbag in accordance with the vehicle seat position and vehicle occupant attitude. Thus, the roof airbag may protect the vehicle occupant irrespective of the vehicle seat position and vehicle occupant attitude.

In a roof airbag system according to a fourth aspect, in the roof airbag system according to the first aspect or the second aspect, at a time in a case in which the seat back of the vehicle seat is tilted more than the predetermined angle to the rear side, the roof airbag is deployed, and at another time, another airbag is deployed.

In the roof airbag system according to the fourth aspect, the other airbag, which differs from the roof airbag in deployment range relative to the vehicle seat, is provided at a location other than the roof portion. The other airbag is, for example, an airbag that is commonly provided at a steering wheel, a side door, a lower portion of an instrument panel or the like. In the present disclosure, the roof airbag is deployed if the seat back of the vehicle seat is tilted to the seat rear side by more than the predetermined angle. Otherwise (if the seat back of the vehicle seat is not tilted to the seat rear side by more than the predetermined angle), the other airbag is deployed.

That is, in the present disclosure, the vehicle occupant may be appropriately protected by use of the roof airbag or of a different airbag being assigned in accordance with the vehicle seat position and vehicle occupant attitude.

In a roof airbag system according to a fifth aspect, in the roof airbag system according to any one of the first to fourth aspects, the vehicle is an autonomous driving vehicle and the roof airbag is deployable at a time of autonomous driving.

In the roof airbag system according to the fifth aspect, when the vehicle is an autonomous driving vehicle, variations of the vehicle seat position and vehicle occupant attitude are greater. Accordingly, during autonomous driving, the vehicle occupant may be appropriately protected by the roof airbag being deployed.

A roof airbag system according to a sixth aspect includes: a roof airbag provided at a roof portion of a vehicle, the roof airbag receiving a supply of gas from an inflator and deploying toward an upper body side of a vehicle occupant sitting on a vehicle seat; a collision sensor that detects a collision of the vehicle; a gas control section that, when a seat back of the vehicle seat is tilted more than a predetermined angle to a seat rear side and the collision sensor detects a collision of the vehicle, controls operation of the inflator so as to deploy the roof airbag; a seat sensor that detects at least one of a position of the vehicle seat in the front-rear direction and a reclining angle of the vehicle seat; an angle adjustment mechanism that is provided at the roof airbag side and adjusts a expansion angle that the roof airbag forms with a ceiling surface of a cabin interior; and an angle control section that adjusts the expansion angle of the roof airbag via the angle adjustment mechanism based on a detection result of the seat sensor.

In the roof airbag system according to the sixth aspect, the roof airbag, the collision sensor, the gas control section, the angle adjustment mechanism and the angle control section are provided. The roof airbag is provided at the roof portion of the vehicle. The roof airbag receives a supply of gas from the inflator and deploys toward the upper body side of a vehicle occupant sitting on the vehicle seat.

In the present disclosure, when a collision of the vehicle is detected by the collision sensor that detects collisions of the vehicle while the seat back of the vehicle seat is tilted more than the predetermined angle toward the seat rear side, operation of the inflator is controlled by the gas control section so as to deploy the roof airbag. Meanwhile, at least one of the position of the vehicle seat in the front-rear direction and the reclining angle of the vehicle seat is detected by the seat sensor. The angle adjustment mechanism is provided at the roof airbag side and adjusts the expansion angle to be formed between the roof airbag and the ceiling surface of the cabin interior. The expansion angle of the roof airbag is adjusted by the angle control section with the angle adjustment mechanism based on detection results from the seat sensor.

When the vehicle seat is disposed at the rear side in the vehicle front-rear direction, the separation distance between the roof airbag and the vehicle occupant on the vehicle seat is greater than when the vehicle seat is disposed at the front side in the vehicle front-rear direction.

However, in the present disclosure, the expansion angle of the roof airbag may be adjusted by the angle adjustment mechanism. Therefore, in the present disclosure, when the vehicle seat is disposed at the rear side in the vehicle front-rear direction, the expansion angle of the roof airbag is specified to be smaller than when the vehicle seat is disposed at the front side in the vehicle front-rear direction. Accordingly, when the vehicle seat is disposed at the rear side in the vehicle front-rear direction, the roof airbag may be deployed further toward the rear side in the vehicle front-rear direction than when the vehicle seat is disposed at the front side in the vehicle front-rear direction.

Thus, in the present disclosure, the deployment amount of the roof airbag may be suppressed by adjusting the expansion angle of the roof airbag in accordance with the vehicle seat position and vehicle occupant attitude. Thus, the roof airbag may protect the vehicle occupant irrespective of the vehicle seat position and vehicle occupant attitude.

In a roof airbag system according to a seventh aspect, the roof airbag system according to the sixth aspect further includes: a lifting mechanism that is provided at a seat cushion side of the vehicle seat and lifts a thigh area of the vehicle occupant; and a seat control section that, when the collision sensor detects the collision of the vehicle, controls the lifting mechanism so as to lift the thigh area of the vehicle occupant.

The roof airbag system according to the seventh aspect additionally includes the lifting mechanism and the seat control section. The lifting mechanism is provided at the seat cushion side of the vehicle seat. The thigh area of the vehicle occupant can be lifted by the lifting mechanism. When the collision sensor detects a collision of the vehicle, the lifting mechanism is controlled by the seat control section so as to lift the thigh area of the vehicle occupant.

That is, in the present disclosure, when a collision of the vehicle is detected by the collision sensor, the thigh area of the vehicle occupant is lifted up. For example, the thigh area of the vehicle occupant is lifted up and the body of the vehicle occupant is inflected into a "V" shape in side view between the thigh area and the upper body. As a result, a spacing between the thigh area and upper body of the vehicle occupant may be made smaller at a time of collision of the vehicle compared to the vehicle occupant sitting in what is referred to as the relaxing attitude.

Therefore, in the present disclosure, a volume by which the roof airbag is deployed may be made smaller and a deployment amount of the roof airbag may be made smaller.

In a roof airbag system according to an eighth aspect, in the roof airbag system according to any one of the first to seventh aspects, based on a detection result of a seat sensor that detects at least one of a position of the vehicle seat in the front-rear direction and a reclining angle of the vehicle seat, the seat back of the vehicle seat is raised to a predetermined angle.

In the roof airbag system according to the eighth aspect, in accordance with detection results from the seat sensor that detects the vehicle seat position or vehicle occupant attitude, the body of the vehicle occupant is inflected into a "V" shape in side view between the thigh area and the upper body by the seat back of the vehicle seat being raised to the predetermined angle together with the thigh area of the vehicle occupant being lifted up by the lifting mechanism.

As a result, for example, a spacing between the thigh area and upper body of a vehicle occupant may be made smaller at a time of collision of the vehicle compared to the vehicle occupant sitting on the vehicle seat in the relaxing attitude. Thus, in the present disclosure, the deployment amount of the roof airbag may be reduced and the deployment amount of the roof airbag may be suppressed.

A vehicle according to a ninth aspect includes the roof airbag system according to any one of the first to eighth aspects.

As described above, the present disclosure provides an excellent effect in that a vehicle occupant may be protected at low cost irrespective of a position of a vehicle seat and an attitude of the vehicle occupant.

BRIEF DESCRIPTION OF THE DRAWINGS

Exemplary embodiments of the present disclosure will be described in detail based on the following figures, wherein:

FIG. 5 is a flowchart describing an example of processing by the ECU according to the exemplary embodiment;

DETAILED DESCRIPTION

Figure 1:
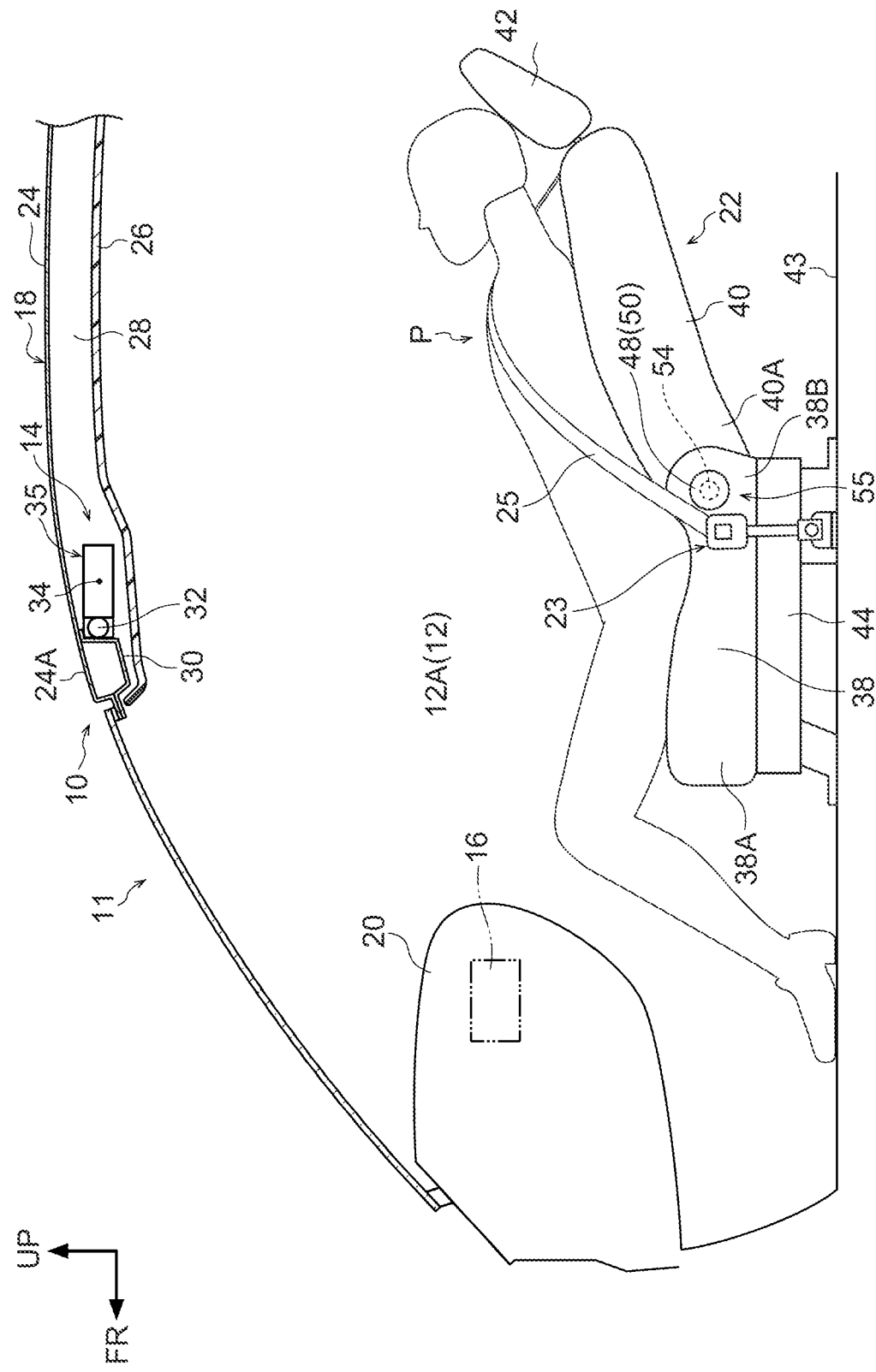
FIG. 1 is a sectional diagram showing a state before deployment of a roof airbag in a cabin of a vehicle according to an exemplary embodiment.

Herebelow, an exemplary embodiment relating to the present disclosure is described in detail in accordance with the drawings. For convenience of description, the arrow UP that is shown where appropriate in the drawings indicates a vehicle upper direction, the arrow FR indicates a vehicle front direction, and the arrow RH indicates a vehicle right direction. Thus, in the following descriptions, where the directions upper and lower, front and rear, and left and right are recited without being particularly specified, the same represent upper and lower in the vehicle vertical direction, front and rear in the vehicle front-rear direction, and left and right in the vehicle left-and-right direction (the vehicle width direction). A vehicle 11 according to the present exemplary embodiment is an autonomous driving vehicle that is capable of autonomous driving.

—Structure of Roof Airbag System—

Structures of a roof airbag system according to an exemplary embodiment of the present disclosure are described.

Figure 2:
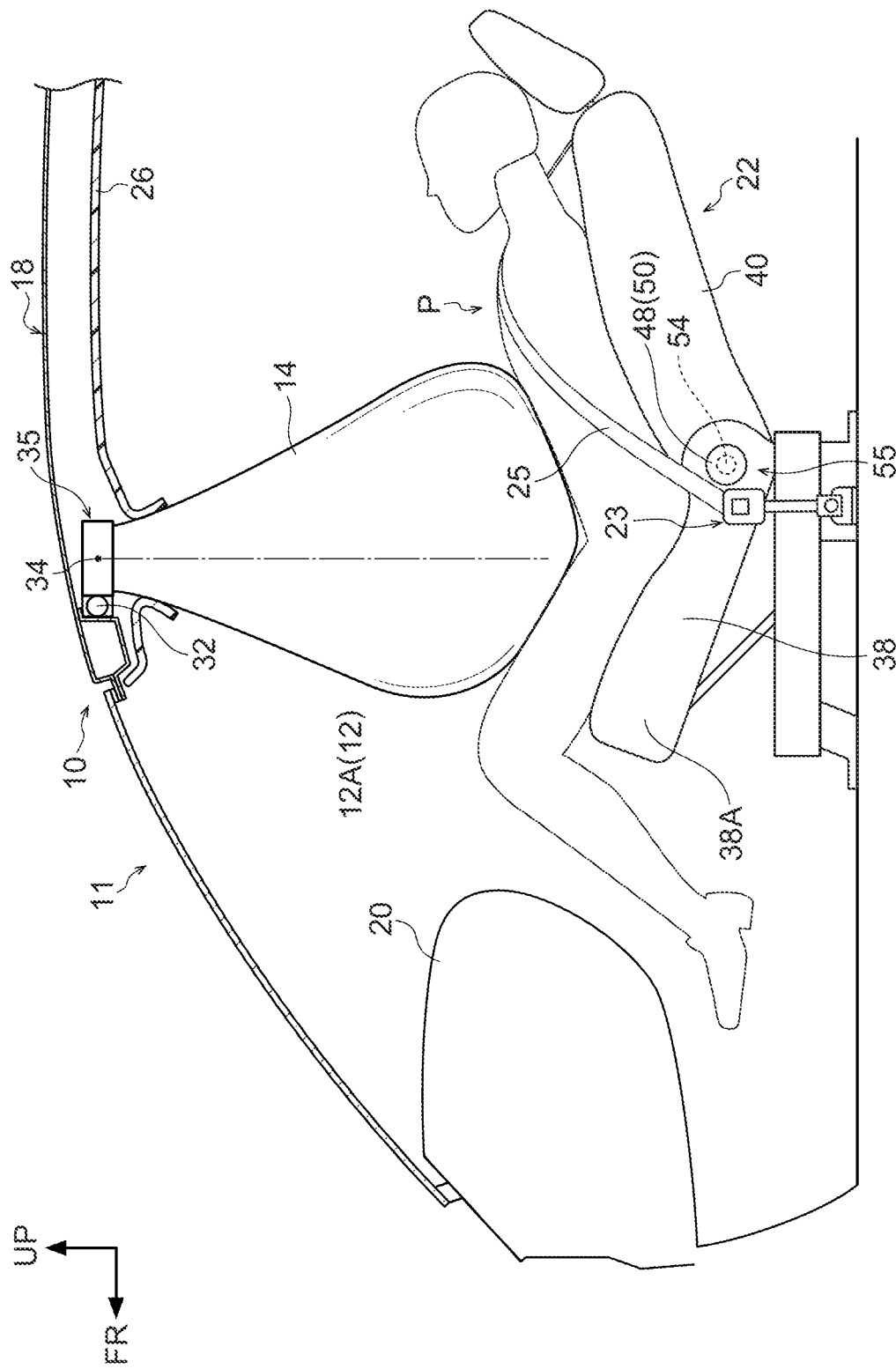
FIG. 2 is a sectional diagram showing a state after deployment of the roof airbag in the cabin of the vehicle according to the exemplary embodiment.

FIG. 1 and FIG. 2 are sectional diagrams of a front portion 12A side of a cabin interior 12 of the vehicle 11, which is equipped with a roof airbag system 10 according to the present exemplary embodiment. A vehicle seat 22 at the vehicle right side is shown in FIG. 1 and FIG. 2. FIG. 1 shows a state before deployment of a roof airbag 14, and FIG. 2 shows a state after deployment of the roof airbag 14.

As shown in FIG. 1, the vehicle 11 according to the present exemplary embodiment includes the roof airbag 14 and an airbag 16, which is different from the roof airbag 14. The roof airbag 14 is provided at a roof portion 18 of the vehicle 11. The airbag 16 is provided, for example, in an instrument panel 20. The instrument panel 20 is mentioned here but, depending on specifications of the vehicle 11, a different term may be given. For example, if the vehicle 11 is a completely autonomous driving vehicle and the instrument panel 20 is not present, a storage box or the like may be used.

As mentioned above, the roof airbag 14 is provided at the roof portion 18 of the vehicle 11. The roof portion 18 includes, for example, a roof panel 24, which is fabricated of steel plate in a substantially rectangular flat plate shape, and a roof head lining 26, which is fabricated of resin in a substantially rectangular flat plate shape. The roof panel 24 constitutes a roof of the vehicle 11. The roof head lining 26 is provided at the lower side of the roof panel 24 and constitutes a ceiling of the cabin interior 12. A ceiling space 28 is provided between the roof panel 24 and the roof head lining 26.

Although not shown in the drawings, roof side rails respectively extend in the vehicle front-rear direction at two vehicle width direction end portions of the roof panel 24. A front roof header 30 is provided along the vehicle width direction at a front end portion 24A of the roof panel 24. Front end portions of the left and right pair of roof side rails are connected together by the front roof header 30. Also not shown in the drawings, a rear roof header that is not shown in the drawings is provided along the vehicle width direction at a rear end portion of the roof panel 24. Rear end portions of the left and right pair of roof side rails are connected together by the rear roof header. The roof panel 24, the front roof header 30 and the rear roof header may be formed of fiber-reinforced resin rather than metal.

The roof airbag 14 is provided in the ceiling space 28 at the rear side of the front roof header 30. As shown in FIG. 2, when gas is supplied from an inflator 32 at a time of frontal collision of the vehicle 11, the roof airbag 14 deploys toward the upper body side of a vehicle occupant P and protects the vehicle occupant P.

In the present exemplary embodiment, a rod portion 34 that is arranged along the vehicle width direction is fixed to the roof airbag 14. An angle adjustment mechanism 35 includes a stepper motor 36 and the rod portion 34. The stepper motor 36 (see FIG. 3) is coupled to the rod portion 34. The rod portion 34 can be turned to predetermined angles by driving of the stepper motor 36.

When the rod portion 34 turns, the roof airbag 14 may be swung in the vehicle front-rear direction integrally with the rod portion 34. Thus, in the present exemplary embodiment, a deployment direction of the roof airbag 14 is adjustable by the angle adjustment mechanism 35. That is, the roof airbag 14 is turned about an axis of the rod portion 34 by the driving of the stepper motor 36 via the rod portion 34.

The vehicle seat 22 includes a seat cushion 38, a seat back 40 and a headrest 42. The seat cushion 38 supports a thigh area and buttock area of the vehicle occupant P sitting on the seat cushion 38 from the seat lower side. The seat back 40 supports the upper body of the vehicle occupant P sitting on the seat cushion 38. The headrest 42 is provided at the upper side of the seat back 40 and supports the head area of the vehicle occupant P from the seat rear side. A three-point seatbelt apparatus 23 is provided at the vehicle seat 22. The vehicle occupant P sitting on the vehicle seat 22 is restrained by a webbing 25, which is structured as a long, narrow, inextensible member.

The seat cushion 38 is provided with a seat cushion frame at a lower portion thereof. Although not shown in the drawings, the seat cushion frame is formed in a rectangular shape in plan view. The seat cushion frame includes a left and right pair of seat side frames, a seat front pan and a connecting rod 48. The seat side frames extend in the seat front-rear direction at both sides of the seat width direction. The seat front pan connects front end portions of the left and right pair of seat side frames with one another in the seat width direction. The connecting rod 48 connects rear end portions of the left and right pair of seat side frames with one another in the vehicle width direction.

The seat side frames are movably (slidably) supported on seat sliding rails 44, which are arranged in the vehicle front-rear direction on a floor panel 43. In the present exemplary embodiment, a position sensor 46 that serves as an example of a seat sensor (see FIG. 3) is provided at, for example, the seat sliding rails 44. Positions of the vehicle seat 22 in the vehicle front-rear direction are detectable by the position sensor 46.

A lower end portion 40A of the seat back 40 is coupled to a rear end portion 38B of the seat cushion 38. To describe this more specifically, the lower end portion 40A of the seat back 40 is turnably connected to the connecting rod 48 provided at the rear end portion 38B of the seat cushion 38.

Therefore, the seat back 40 is turnable about the connecting rod 48 relative to the seat cushion 38. That is, a reclining mechanism 50 is provided at the region of coupling between the seat cushion 38 and the seat back 40, and the seat back 40 is turned (reclined) relative to the seat cushion 38 by the reclining mechanism 50.

In the present exemplary embodiment, an angle sensor 52 that serves as an example of the seat sensor (see FIG. 3) is provided at, for example, the reclining mechanism 50. A reclining angle of the seat back 40 of the vehicle seat 22 is detectable by the angle sensor 52. When the reclining angle exceeds a predetermined angle, the vehicle seat 22 is in what is referred to as a relaxing attitude (see FIG. 1). The relaxing attitude is a state in which the upper body and legs of the vehicle occupant P are distant from the steering wheel and pedals and the vehicle seat 22 is slid rearward such that the knees are extended, and is also a state in which the seat back is tilted such that the back of the vehicle occupant P is straightened.

In the present exemplary embodiment, a rod portion 54 is provided, for example, at the rear end portion 38B of the seat cushion 38. Although not shown in the drawings, the rod portion 54 runs along the seat width direction. The rod portion 54 is provided integrally with the seat cushion 38, and the seat cushion 38 can be turned by turning of the rod portion 54.

A lifting mechanism 55 includes a stepper motor 56 and the rod portion 54. The stepper motor 56 (see FIG. 3) is coupled to the rod portion 54. The rod portion 54 is turnable to predetermined angles by driving of the stepper motor 56. That is, the seat cushion 38 is turned (lifted) about an axis of the rod portion 54 by the driving of the stepper motor 56 via the rod portion 54. In this exemplary embodiment, the rod portion 54 is provided coaxially with the connecting rod 48, but need not necessarily be coaxial therewith.

—Hardware Structures of the Roof Airbag System—

Figure 3:
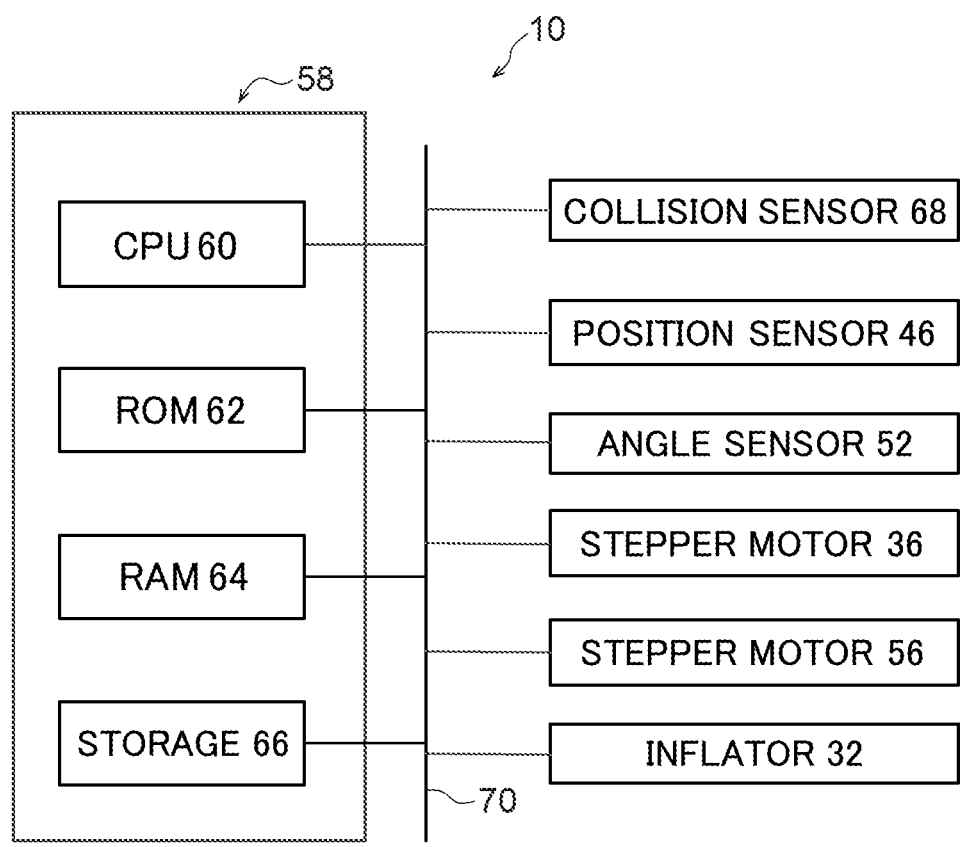
FIG. 3 is a block diagram showing hardware structures of a roof airbag system according to the exemplary embodiment.

Now, hardware structures of the vehicle 11 provided with the roof airbag system 10 are described with reference to FIG. 3. FIG. 3 is a block diagram showing the hardware structures of the vehicle 11 provided with the roof airbag system 10.

An electronic control unit (ECU) 58 that is a control section is provided in the vehicle 11. The roof airbag system 10 is electronically connected to the ECU 58.

As shown in FIG. 3, the ECU 58 principally includes a central processing unit (CPU) 60, read-only memory (ROM) 62, random access memory (RAM) 64 and storage 66. The ECU 58, a collision sensor 68, the stepper motor 36, the position sensor 46, the angle sensor 52, the stepper motor 56 and the inflator 32 are connected to be capable of communications with one another via a bus 70.

The CPU 60, which serves as a processor, is a central arithmetic processing unit that executes various programs and controls respective parts. That is, the CPU 60 reads a program from the ROM 62 or the storage 66, which serves as memory, and executes the program using the RAM 64 as a workspace. The CPU 60 performs control of the structures described above and various kinds of computational processing and the like in accordance with programs memorized in the ROM 62 or the storage 66.

The ROM 62 stores various programs and various kinds of data. The RAM 64 serves as a workspace, temporarily memorizing programs and memorizing data. The storage 66 includes a hard disk drive (HDD) or solid state drive (SSD). The storage 66 stores various programs, including an operating system, and various kinds of data.

—Functional Structures of the Roof Airbag System—

Figure 4:
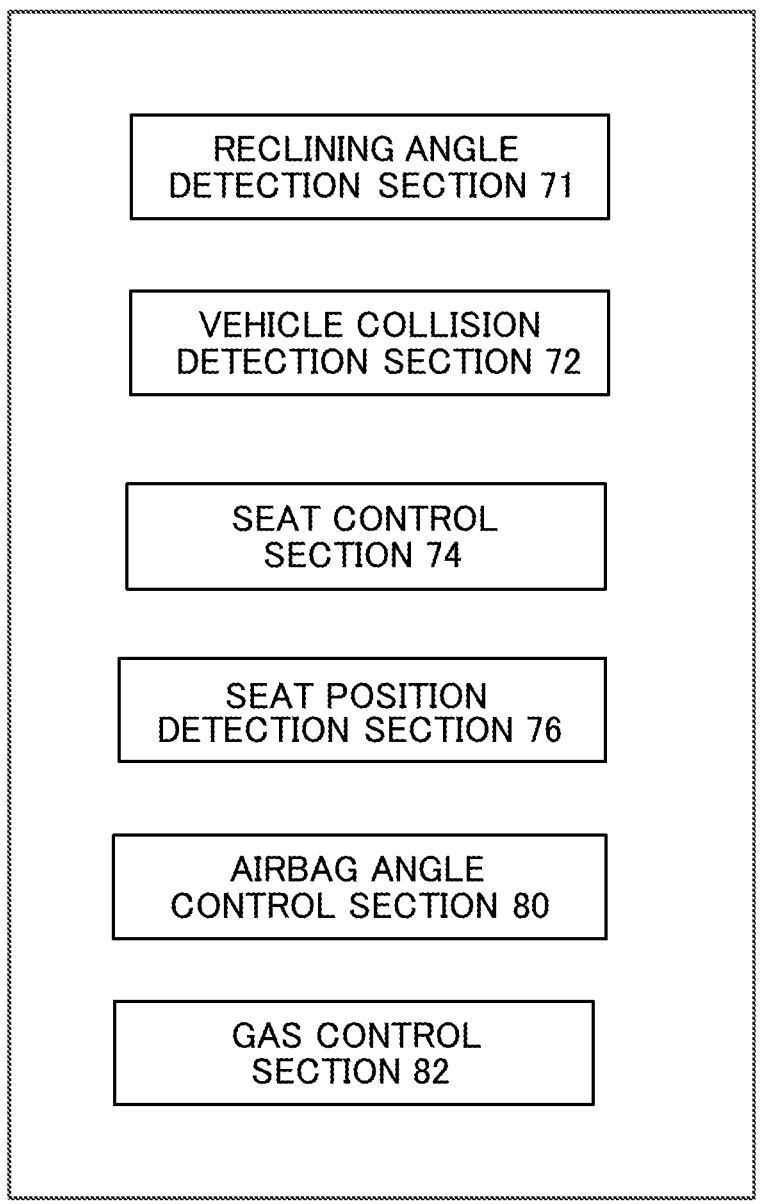
FIG. 4 is a block diagram showing functional structures of an ECU according to the exemplary embodiment.

Now, functions of the roof airbag system are described. FIG. 4 is a block diagram showing functional structures of the ECU 58 of the vehicle 11 provided with the roof airbag system 10.

The ECU 58 of the vehicle 11 provided with the roof airbag 14 employs the hardware resources described above to realize various functions. As shown in FIG. 4, functional structures of the ECU 58 of the vehicle 11 provided with the roof airbag system 10 that can be mentioned are a reclining angle detection section 71, a vehicle collision detection section 72, a seat control section 74, a seat position detection section 76, an airbag angle control section 80 that serves as an angle control section, and a gas control section 82. These functional structures are realized by the CPU 60 reading and executing a program memorized in the ROM 62 or the storage 66.

The reclining angle detection section 71 detects reclining angles of the seat back 40 of the vehicle seat 22 with the angle sensor 52. Based on a detection result, the reclining angle detection section 71 confirms whether or not the vehicle seat 22 is in the relaxing attitude.

This exemplary embodiment is specified such that whether or not the vehicle seat 22 is in the relaxing attitude is verified by the angle sensor 52, but this is not limiting. For example, whether or not the vehicle seat 22 is in the relaxing attitude may be verified from, for example, video images captured by a camera provided in the cabin interior 12.

The vehicle collision detection section 72 detects or predicts a collision of the vehicle 11. More specifically, the vehicle collision detection section 72 detects or predicts a collision of the vehicle 11 by receiving signals from plural sensors provided in the vehicle 11, such as the collision sensor 68 and the like.

The seat control section 74 turns the seat cushion 38, via the rod portion 54, by driving the stepper motor 56. Thus, the seat control section 74 lifts a distal end portion 38A of the seat cushion 38.

The seat position detection section 76 detects positions of the vehicle seat 22 in the vehicle front-rear direction with the position sensor 46.

Based on a position in the vehicle front-rear direction of the vehicle seat 22 detected by the seat position detection section 76, the airbag angle control section 80 drives the stepper motor 36 and turns the roof airbag 14 to a predetermined angle via the rod portion 34, adjusting the deployment direction of the roof airbag 14.

The gas control section 82 controls respective airbag devices installed in the vehicle 11. The gas control section 82 causes airbags to inflate and deploy in accordance with a collision mode detected or predicted by the vehicle collision detection section 72. For example, the gas control section 82 operates the inflator 32, the inflator 32 produces gas, the gas is supplied into the roof airbag 14, and the roof airbag 14 is inflated and deployed.

—Operation and Effects of the Roof Airbag System—

Now, operation and effects of the roof airbag system according to the exemplary embodiment of the present disclosure are described.

An example of processing by the ECU 58 of the vehicle 11 illustrated in FIG. 1 and FIG. 3 is described using the flowchart shown in FIG. 5. This deployment processing of the roof airbag 14 of the vehicle 11 is executed by the CPU 60 shown in FIG. 3 reading out a display program from the ROM 62 or the storage 66, loading the program into the RAM 64 and executing the program.

As shown in FIG. 5, in step S100, the CPU 60 detects a position of the vehicle seat 22 in the vehicle front-rear direction with the position sensor 46 (detect seat position).

Then, in step S102, the CPU 60 makes a determination from the angle sensor 52 as to whether the vehicle seat 22 is in the relaxing attitude.

When the CPU 60 determines that the vehicle seat 22 is in the relaxing attitude (see FIG. 1) in step S102 ("Y" in step S102), the CPU 60 proceeds to the processing of step S104.

When the CPU 60 determines in step S102 that the vehicle seat 22 is not in the relaxing attitude ("N" in step S102), the CPU 60 ends the processing. That is, the other airbag 16 that is different from the roof airbag 14, and which is provided at the steering wheel, a side door, a lower portion of the instrument panel or the like, is deployed.

In step S104, the CPU 60 drives the stepper motor 36 provided at the roof airbag 14 and, via the rod portion 34, turns the roof airbag 14 to a predetermined angle, adjusting the deployment direction of the roof airbag 14.

In step S106, the CPU 60 makes a determination from the collision sensor 68 and the like as to whether the vehicle 11 is in a collision (see FIG. 1).

When the CPU 60 determines in step S106 that the vehicle 11 is in a collision ("Y" in step S106), the CPU 60 proceeds to the processing of step S108.

When the CPU 60 determines in step S106 that the vehicle 11 is not in a collision ("N" in step S106), the CPU 60 repeats the processing, until the CPU 60 determines that the vehicle 11 is in a collision.

In step S108, the CPU 60 drives the stepper motor 56 provided at the seat cushion 38 of the vehicle seat 22 and, via the rod portion 54, turns the seat cushion 38 to a predetermined angle, lifting up the distal end portion 38A of the seat cushion 38.

In step S110, the CPU 60 operates the inflator 32 to produce gas, the gas is supplied to the roof airbag 14, and the roof airbag 14 is inflated and deployed.

A flow for inflating and deploying the roof airbag 14 is not limited thus. For example, in the present exemplary embodiment, before determining that the vehicle 11 is in a collision, the CPU 60 detects the seat position beforehand in step S100 and adjusts the deployment direction of the roof airbag 14 in step S104. However, the CPU 60 may be configured to execute these steps of detection and adjustment at the same time after determining that the vehicle 11 is in a collision.

As described above, in the present exemplary embodiment as shown in FIG. 1 and FIG. 2, the lifting mechanism 55 that lifts the thigh area of the vehicle occupant P is provided at the seat cushion 38 side of the vehicle seat 22. In the present exemplary embodiment, if a collision of the vehicle 11 is detected by the collision sensor 68 that detects collisions of the vehicle 11 while the vehicle seat 22 is in the relaxing attitude, the lifting mechanism 55 is controlled by the seat control section 74 so as to instantaneously lift the thigh area of the vehicle occupant P, and the gas control section 82 (see FIG. 4) performs control.

To describe this more specifically, in the present exemplary embodiment, when a collision of the vehicle 11 is detected by the collision sensor 68 (see FIG. 3), the stepper motor 56 (see FIG. 3) is driven. In consequence, the rod portion 54 turns to a predetermined angle and, via the rod portion 54, the distal end portion 38A of the seat cushion 38 is lifted up. In addition, operation of the inflator 32 (see FIG. 3) is controlled by the gas control section 82 so as to deploy the roof airbag 14. That is, the inflator 32 operates and produces gas, and the roof airbag 14 inflates and deploys.

Thus, in the present exemplary embodiment, when the thigh area of the vehicle occupant P is lifted up by the lifting mechanism 55 via the seat cushion 38, the body of the vehicle occupant P is inflected into a "V" shape in side view between the thigh area and the upper body. Therefore, a spacing between the thigh area and upper body of the vehicle occupant P sitting on the vehicle seat 22 in the relaxing attitude, for example, as shown in FIG. 1, may be made smaller at a time of collision of the vehicle 11, as shown in FIG. 2.

Meanwhile, the roof airbag 14 deploys toward the upper body side of the vehicle occupant P. More specifically, the roof airbag 14 is deployed to between the thigh area and upper body of the vehicle occupant P. As a result, in the present exemplary embodiment, kinetic energy of the upper body of the vehicle occupant P is absorbed by the roof airbag 14. Moreover, the vehicle occupant P receives an amount of energy urging the vehicle occupant P forward (inertial energy) at the whole of the back of the thigh area via the seat cushion 38. Therefore, energy that would be applied to an upper body restraint may be borne at the thigh area side.

Thus, in the present exemplary embodiment, because the body of the vehicle occupant P is inflected into the "V" shape and the spacing between the thigh area and upper body of the vehicle occupant P is made smaller, a volume by which the roof airbag 14 is deployed may be reduced. That is, a deployment amount of the roof airbag 14 may be reduced in the present exemplary embodiment. Therefore, in the present exemplary embodiment, the deployment amount of the roof airbag 14 may be suppressed and costs may be reduced.

In the present exemplary embodiment, because the body of the vehicle occupant P is inflected by the lifting mechanism 55 into the "V" shape in side view between the thigh area and upper body, positioning of the roof airbag 14 is possible. Furthermore, in the present exemplary embodiment, a posture that sinks into the seat cushion 38, known as "submarining", at a time of frontal collision of the vehicle 11 may be suppressed. That is, because the waist area of the vehicle occupant P is stopped at the sitting position thereof by the turning of the seat cushion 38, the waist area may be firmly restrained by the webbing 25.

In the present exemplary embodiment, a position of the vehicle seat 22 in the front-rear direction is detected by the position sensor 46 (see FIG. 3). The expansion angle θ of the roof airbag 14 is adjusted by the airbag angle control section 80 based on detection results from the position sensor 46.

Figure 6A:
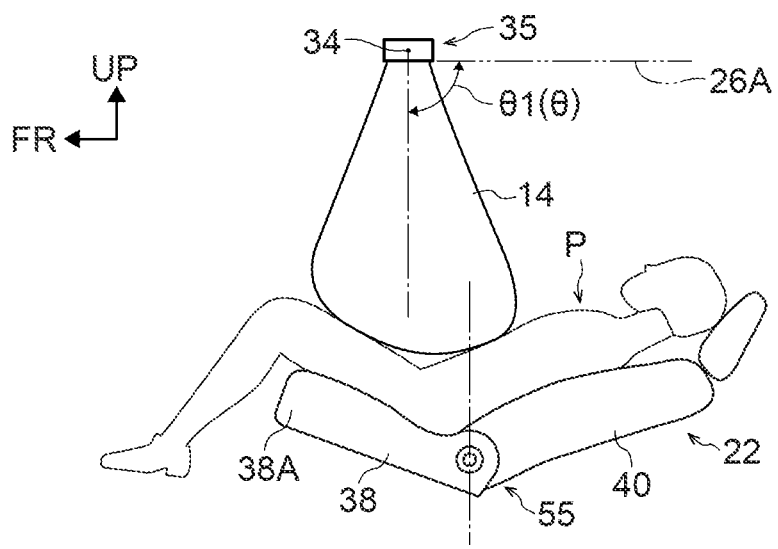
FIG. 6A is a side view for describing operation of the roof airbag system according to the exemplary embodiment.
Figure 6B:
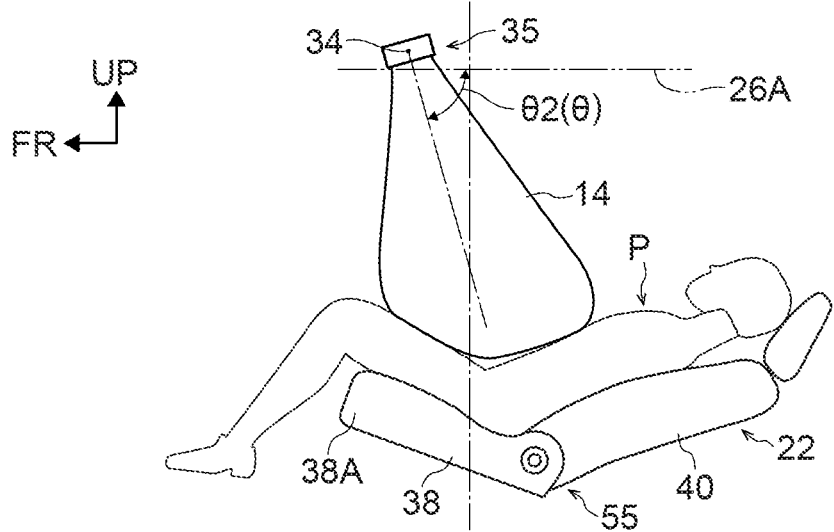
FIG. 6B is a side view for describing operation of the roof airbag system according to the exemplary embodiment.
Figure 6C:
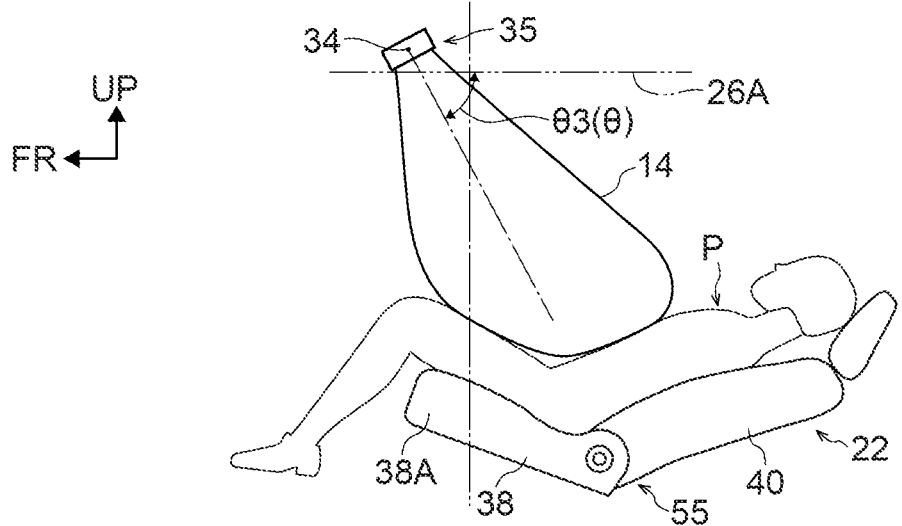
FIG. 6C is a side view for describing operation of the roof airbag system according to the exemplary embodiment.

When the vehicle seat 22 is disposed at the rear side in the vehicle front-rear direction, as shown in FIG. 6C, a separation distance between the roof airbag 14 and the vehicle occupant P is greater than when the vehicle seat 22 is disposed at the front side in the vehicle front-rear direction, as shown in FIG. 6A.

However, in the present exemplary embodiment, as shown in FIG. 6A to FIG. 6C, the angle adjustment mechanism 35 is provided and the expansion angle θ of the roof airbag 14 may be adjusted by the airbag angle control section 80 (see FIG. 4).

The more acute the expansion angle θ that the roof airbag 14 forms with a ceiling surface 26A of the cabin interior 12, the further toward the rear side in the vehicle front-rear direction the roof airbag 14 deploys.

Therefore, in the present exemplary embodiment, the expansion angle θ of the roof airbag 14 is specified to be smaller when the vehicle seat 22 is disposed at the rear side in the vehicle front-rear direction than when the vehicle seat 22 is disposed at the front side in the vehicle front-rear direction (θ3<θ2<θ1). As a result, when the vehicle seat 22 is disposed at the rear side in the vehicle front-rear direction, the roof airbag 14 may be deployed further toward the rear side in the vehicle front-rear direction than when the vehicle seat 22 is disposed at the front side in the vehicle front-rear direction.

To describe this more specifically, the rod portion 34 arranged along the vehicle width direction is fixed to the roof airbag 14. The stepper motor 36 (see FIG. 3) is coupled to the rod portion 34. The rod portion 34 can be turned to predetermined angles by driving of the stepper motor 36. When the rod portion 34 turns, the roof airbag 14 may be swung in the vehicle front-rear direction integrally with the rod portion 34. Thus, in the present exemplary embodiment, the deployment direction of the roof airbag 14 is adjustable.

In the present exemplary embodiment as described above, the deployment amount of the roof airbag 14 may be suppressed by adjusting the expansion angle θ of the roof airbag 14 in accordance with the position of the vehicle seat 22 and the attitude of the vehicle occupant P. Thus, the roof airbag 14 may protect the vehicle occupant P irrespective of the position of the vehicle seat 22 and the attitude of the vehicle occupant P.

In the present exemplary embodiment, a spacing between the thigh area and upper body of the vehicle occupant P may be made smaller at a time of collision of the vehicle 11, compared to the vehicle occupant P sitting in the relaxing attitude, by the thigh area of the vehicle occupant P being lifted up by the lifting mechanism 55, via the distal end portion 38A of the seat cushion 38. Therefore, in addition to positioning of the roof airbag 14 being possible, the deployment amount of the roof airbag 14 may be further reduced.

Figure 7:
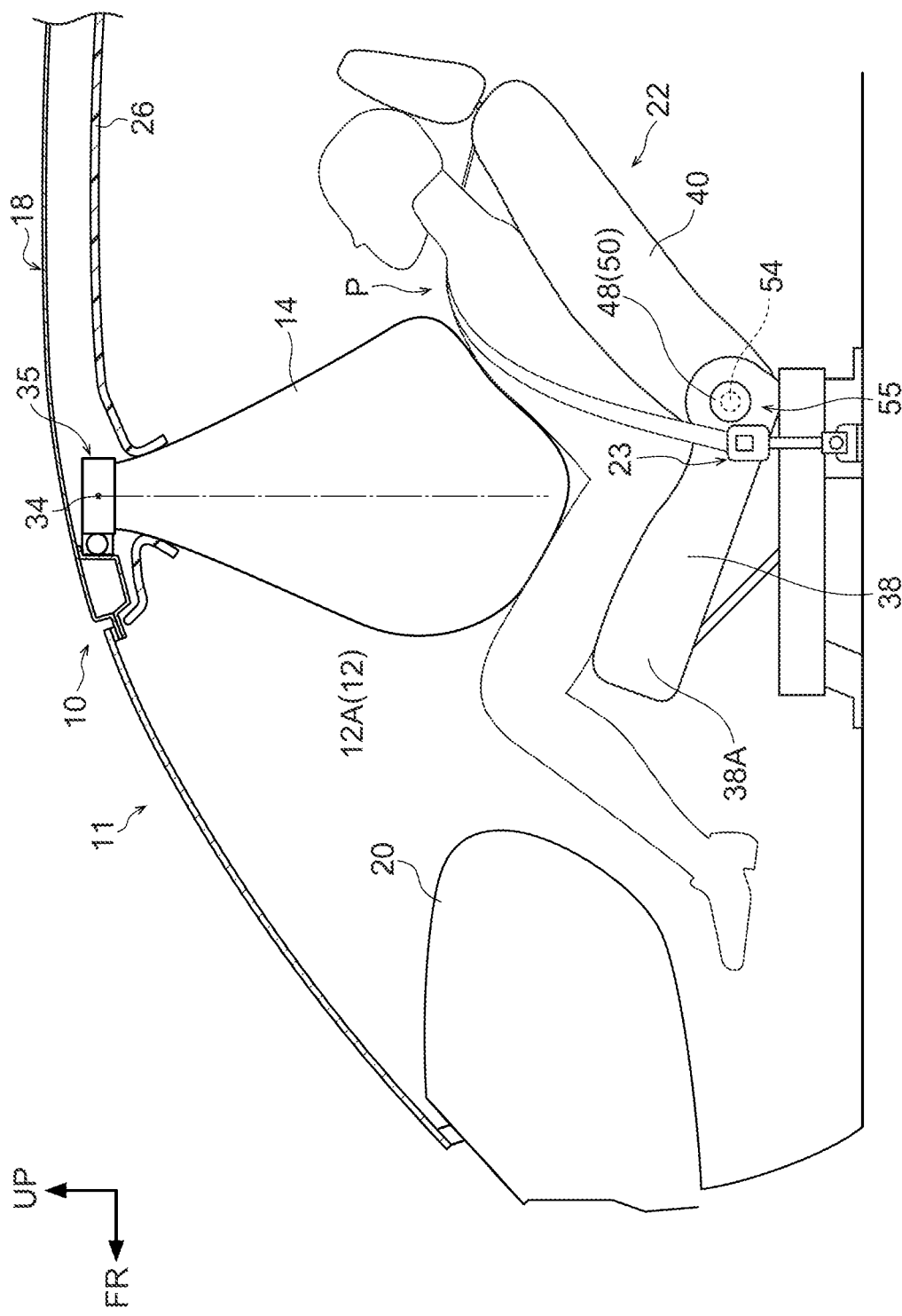
FIG. 7 is a sectional diagram showing a state after deployment of a roof airbag illustrating a variant example of the roof airbag system according to the exemplary embodiment.

In the present exemplary embodiment, as shown in FIG. 7, the seat back 40 of the vehicle seat 22 may be raised to a predetermined angle in accordance with detection results of the position of the vehicle seat 22 and the attitude of the vehicle occupant P from the position sensor 46 and the like. In a case in which the seat back 40 is raised, the body of the vehicle occupant P is inflected further into the "V" shape in side view between the thigh area and upper body, by the thigh area of the vehicle occupant P being lifted up by the lifting mechanism 55 and the upper body of the vehicle occupant P being raised by the seat back 40.

Thus, in the present exemplary embodiment, the deployment amount of the roof airbag 14 may be further reduced. Moreover, because the seat back 40 side of the vehicle seat 22 in the relaxing attitude is raised as well as the distal end portion 38A of the seat cushion 38 being lifted, the body of the vehicle occupant P may be inflected into the "V" shape more quickly.

As a further example, although not shown in the drawings, detection of the position of the vehicle seat 22 in the front-rear direction by the position sensor 46 is not limiting. A lifting amount of the thigh area of the vehicle occupant P by the lifting mechanism 55 may be adjusted by the seat control section 74 based on detection of the reclining angle of the vehicle seat 22 by the angle sensor 52.

For example, when the reclining angle of the vehicle seat 22 is larger, the separation distance between the roof airbag 14 and the vehicle occupant P is greater. Accordingly, the spacing between the thigh area and upper body of the vehicle occupant P may be made smaller by increasing the lifting amount of the thigh area of the vehicle occupant P.

Thus, because the lifting amount of the thigh area of the vehicle occupant P is adjusted by the seat control section 74 in accordance with the attitude of the vehicle occupant P, the roof airbag 14 may protect the vehicle occupant P irrespective of the attitude of the vehicle occupant P.

Clearly, the lifting amount of the thigh area of the vehicle occupant P by the lifting mechanism 55 may be adjusted by the seat control section 74 in accordance with detection of the position of the vehicle seat 22 in the front-rear direction by the position sensor 46 and detection of the reclining angle of the vehicle seat 22 by the angle sensor 52.

In the present exemplary embodiment, the seat cushion 38 is turnable by the lifting mechanism 55 about the rod portion 54 provided at the rear end portion 38B of the seat cushion 38. However, this is not limiting, because it is sufficient that the thigh area of the vehicle occupant P can be lifted up. For example, the vehicle seat 22 may be moved to the upper side by a lifter apparatus.

In the exemplary embodiment described above, the roof airbag 14 is described. Clearly, the other airbag 16 that is different from the roof airbag 14, which is provided at the steering wheel, side door, lower portion of the instrument panel or the like, may be deployed toward the vehicle seat 22.

For example, in the present exemplary embodiment, the roof airbag 14 deploys when the vehicle seat 22 is in the relaxing attitude, and the airbag 16 deploys when the vehicle seat 22 is in an attitude other than the relaxing attitude. That is, in this exemplary embodiment, the vehicle occupant P may be appropriately protected by use of the roof airbag 14 or the other airbag 16 that is different from the roof airbag 14 being assigned in accordance with the position of the vehicle seat 22 and the attitude of the vehicle occupant P. In the present exemplary embodiment, the roof airbag 14 and the other airbag 16 at the driver seat side are described; airbags at a front passenger seat side are substantially the same as at the driver seat side.

Variations of positions of the vehicle seat 22 and attitudes of the vehicle occupant P are greater when the vehicle 11 is driving autonomously. Accordingly, during autonomous driving, the vehicle occupant P may be appropriately protected by the roof airbag 14 being deployed. From another perspective, during autonomous driving in the present exemplary embodiment, the vehicle occupant P may be restrained during a frontal collision of the vehicle 11 while remaining in the relaxing attitude. Therefore, a degree of variation of the relaxing attitude is broader.

The processing executed by the CPU 60 according to the exemplary embodiment of the present disclosure is described as software processing that is implemented by a program being executed, but this is not limiting. For example, the processing may be implemented in hardware. Alternatively, the processing may combine both software and hardware. Further, if the processing is implemented in software, the program may be memorized in any of various non-transitory storage media such as a DVD (Digital Versatile Disc) or the like, distributed, and executed by a processor such as the CPU 60 or the like.

What is claimed is:

1. A roof airbag system comprising:
   a roof airbag provided at a roof portion of a vehicle, the roof airbag receiving a supply of gas from an inflator and deploying toward an upper body side of a vehicle occupant sitting on a vehicle seat;
   a lifting mechanism that is provided at a seat cushion side of the vehicle seat and lifts a thigh area of the vehicle occupant;
   a collision sensor that detects a collision of the vehicle; a memory;
   a seat sensor that detects at least one of a position of the vehicle seat in a vehicle front-rear direction or a reclining angle of the vehicle seat an angle adjustment mechanism that is provided at a roof airbag side and adjusts a deployment angle that the roof airbag forms with a ceiling surface of a cabin interior; and
   a processor coupled to the memory, the processor is configured to:
   adjust an expansion angle of the roof airbag via the angle adjustment mechanism based on a detection result of the seat sensor;
   in a case in which a seat back of the vehicle seat is tilted more than a predetermined angle to a seat rear side and the collision sensor detects a collision of the vehicle, control the lifting mechanism so as to lift the thigh area of the vehicle occupant; and
   in a case in which the seat back of the vehicle seat is tilted more than the predetermined angle to the seat rear side and the collision sensor detects a collision of the vehicle, control operation of the inflator so as to deploy the roof airbag.

2. The roof airbag system according to claim 1, the processor is configured to adjust a lifting amount of the thigh area of the vehicle occupant by the lifting mechanism based on a detection result of the seat sensor.

3. The roof airbag system according to claim 2, wherein another airbag is provided at a location other than the roof portion, the other airbag differing from the roof airbag in deployment range relative to the vehicle seat, and the processor is configured to,
at a time at which the seat back of the vehicle seat is tilted more than the predetermined angle to the seat rear side, deploy the roof airbag, and
at a time at which the seat back of the vehicle seat is not tilted more than the predetermined angle to the seat rear side, deploy the another airbag.

4. The roof airbag system according to claim 1, wherein the processor is configured to, based on a detection result of a seat sensor that detects at least one of a position of the vehicle seat in a vehicle front-rear direction or a reclining angle of the vehicle seat, raise the seat back of the vehicle seat to a predetermined angle.

5. A roof airbag system comprising:
a roof airbag provided at a roof portion of a vehicle, the roof airbag receiving a supply of gas from an inflator and deploying toward an upper body side of a vehicle occupant sitting on a vehicle seat;
a collision sensor that detects a collision of the vehicle;
a seat sensor that detects at least one of a position of the vehicle seat in a vehicle front-rear direction or a reclining angle of the vehicle seat;
an angle adjustment mechanism that is provided at a roof airbag side and adjusts a deployment angle that the roof airbag forms with a ceiling surface of a cabin interior;
a memory; and
a processor coupled to the memory,
the processor is configured to:
in a case in which a seat back of the vehicle seat is tilted more than a predetermined angle to the seat rear side and the collision sensor detects a collision of the vehicle, control operation of the inflator so as to deploy the roof airbag; and
adjust an expansion angle of the roof airbag via the angle adjustment mechanism based on a detection result of the seat sensor.

6. The roof airbag system according to claim 5, further comprising a lifting mechanism that is provided at a seat cushion side of the vehicle seat and lifts a thigh area of the vehicle occupant, wherein the processor is configured to, in a case in which the collision sensor detects a collision of the vehicle, control the lifting mechanism so as to lift the thigh area of the vehicle occupant.

7. A roof airbag system comprising:
a roof airbag provided at a roof portion of a vehicle, the roof airbag receiving a supply of gas from an inflator and deploying toward an upper body side of a vehicle occupant sitting on a vehicle seat;
a lifting mechanism that is provided at a seat cushion side of the vehicle seat and lifts a thigh area of the vehicle occupant;
a collision sensor that detects a collision of the vehicle; a memory;
a seat sensor that detects at least one of a position of the vehicle seat in a vehicle front-rear direction or a reclining angle of the vehicle seat;
another airbag is provided at a location other than the roof portion, the other airbag differing from the roof airbag in deployment range relative to the vehicle seat; and
a processor coupled to the memory, the processor is configured to:
adjust a lifting amount of the thigh area of the vehicle occupant by the lifting mechanism based on a detection result of the seat sensor,
in a case in which a seat back of the vehicle seat is tilted more than a predetermined angle to a seat rear side and the collision sensor detects a collision of the vehicle, control the lifting mechanism so as to lift the thigh area of the vehicle occupant,
in a case in which the seat back of the vehicle seat is tilted more than the predetermined angle to the seat rear side and the collision sensor detects a collision of the vehicle, control operation of the inflator so as to deploy the roof airbag,
at a time at which the seat back of the vehicle seat is tilted more than the predetermined angle to the seat rear side, deploy the roof airbag, and
at a time at which the seat back of the vehicle seat is not tilted more than the predetermined angle to the seat rear side, deploy the another airbag.

8. The roof airbag system according to claim 7, the processor is configured to, based on a detection result of a seat sensor that detects at least one of a position of the vehicle seat in a vehicle front-rear direction or a reclining angle of the vehicle seat, raise the seat back of the vehicle seat to a predetermined angle.

* * * * *